US011200519B1

United States Patent
Roa et al.

(10) Patent No.: US 11,200,519 B1
(45) Date of Patent: Dec. 14, 2021

(54) DRAG AND DROP ALLOCATION IN PLM

(71) Applicant: Centric Software, Inc., Los Gatos, CA (US)

(72) Inventors: Humberto Roa, Bainbridge Island, WA (US); Ron Watson, Los Gatos, CA (US); Ravi Rangan, Bothell, WA (US)

(73) Assignee: Centric Software, Inc., Campbell, CA (US)

( * ) Notice: Subject to any disclaimer, the term of this patent is extended or adjusted under 35 U.S.C. 154(b) by 557 days.

(21) Appl. No.: 15/147,798

(22) Filed: May 5, 2016

Related U.S. Application Data

(60) Provisional application No. 62/157,378, filed on May 5, 2015, provisional application No. 62/157,384, filed on May 5, 2015, provisional application No. 62/157,392, filed on May 5, 2015.

(51) Int. Cl.
*G06Q 10/06* (2012.01)
*G06F 3/0486* (2013.01)
*G06F 3/0488* (2013.01)

(52) U.S. Cl.
CPC ....... *G06Q 10/0631* (2013.01); *G06F 3/0486* (2013.01); *G06F 3/0488* (2013.01)

(58) Field of Classification Search
CPC .............. G06Q 10/0631; G06F 3/0486; G06F 3/0488
USPC ........................................................ 705/7.12
See application file for complete search history.

(56) References Cited

U.S. PATENT DOCUMENTS

| | | | | |
|---|---|---|---|---|
| 5,760,773 A * | 6/1998 | Berman | ................ | G06F 1/1626 345/672 |
| 5,826,265 A * | 10/1998 | Van Huben | ......... | G06F 16/2308 |
| 5,864,875 A * | 1/1999 | Van Huben | ............. | G06F 30/00 |
| 6,720,985 B1 * | 4/2004 | Silverbrook | ........... | B42D 15/02 345/179 |
| 7,013,290 B2 * | 3/2006 | Ananian | ................ | G06Q 30/02 705/26.42 |
| 7,814,429 B2 * | 10/2010 | Buffet | .................... | G06Q 10/10 715/763 |
| 7,913,190 B2 * | 3/2011 | Grimaud | ................. | G06T 19/00 345/419 |
| 8,519,963 B2 * | 8/2013 | Kocienda | ............ | G06F 3/04883 345/173 |
| 9,075,931 B2 * | 7/2015 | Charles | .................... | G06T 19/20 |
| 9,519,356 B2 * | 12/2016 | Hinckley | ................. | G06F 3/033 |
| 2007/0234227 A1 * | 10/2007 | Prinsen | ................. | G06F 3/0486 715/769 |

(Continued)

FOREIGN PATENT DOCUMENTS

JP 2009146334 A * 12/2007

OTHER PUBLICATIONS

"A New Direction on Auto-Building Database Application System" Tang et al., Sep. 10, 2011 (Year: 2011).*

*Primary Examiner* — Charles Guiliano
*Assistant Examiner* — Po Han Lee
(74) *Attorney, Agent, or Firm* — Aka Chan LLP

(57) ABSTRACT

A system includes software that mimics a paper based allocation process. Business objects can be presented graphically on a touch screen, and users can allocate business objects with other business objects using a drag and drop motion. For example, a symbol representing a business object can be dragged and dropped onto a symbol representing another business object. This will trigger a relationship to be created in the PLM database between the two business objects.

28 Claims, 15 Drawing Sheets

(56) References Cited

U.S. PATENT DOCUMENTS

| | | | |
|---|---|---|---|
| 2009/0276701 A1* | 11/2009 | Nurmi | G06F 3/0238 |
| | | | 715/702 |
| 2011/0029934 A1* | 2/2011 | Locker | G06F 3/04883 |
| | | | 715/863 |
| 2011/0148873 A1* | 6/2011 | Radet | G06F 30/00 |
| | | | 345/420 |
| 2012/0265644 A1* | 10/2012 | Roa | H04W 4/50 |
| | | | 705/26.61 |
| 2013/0006408 A1* | 1/2013 | Zakrzwski | G06Q 10/0875 |
| | | | 700/107 |
| 2013/0144566 A1* | 6/2013 | De Biswas | G06Q 10/101 |
| | | | 703/1 |
| 2013/0166573 A1* | 6/2013 | Vaitheeswaran | |
| | | | G06F 17/30389 |
| | | | 707/749 |
| 2013/0325844 A1* | 12/2013 | Plaisant | G06F 3/04886 |
| | | | 707/722 |
| 2015/0286393 A1* | 10/2015 | Wild | B60K 37/06 |
| | | | 715/771 |
| 2016/0092529 A1* | 3/2016 | Lu | G06F 3/0486 |
| | | | 715/771 |
| 2016/0217424 A1* | 7/2016 | Challenger | G06Q 10/067 |
| 2017/0235436 A1* | 8/2017 | Hooton | G06F 3/0486 |
| | | | 705/7.11 |

* cited by examiner

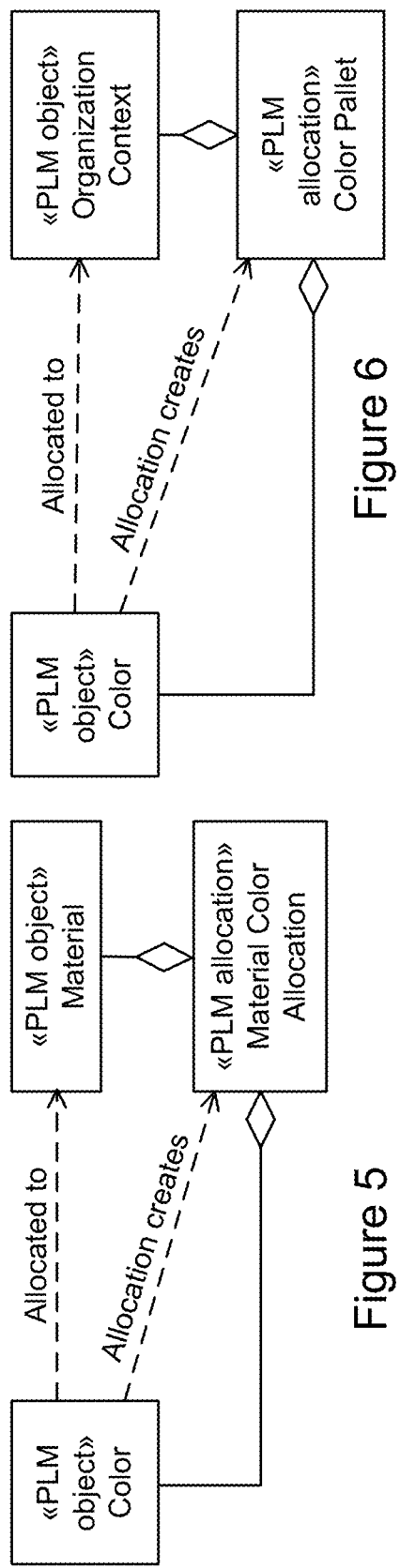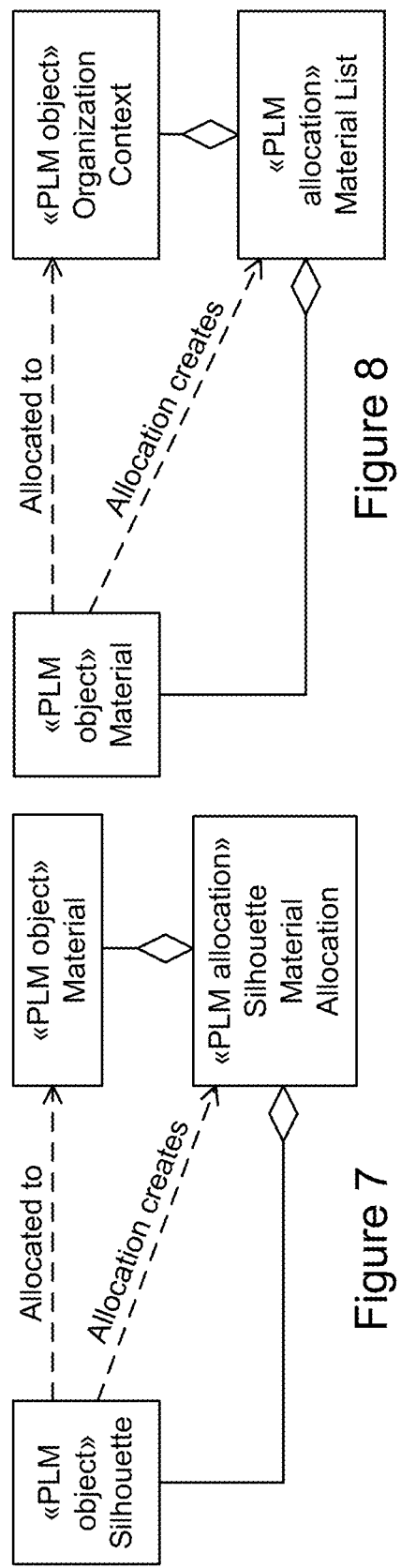
Figure 5
Figure 6
Figure 7
Figure 8

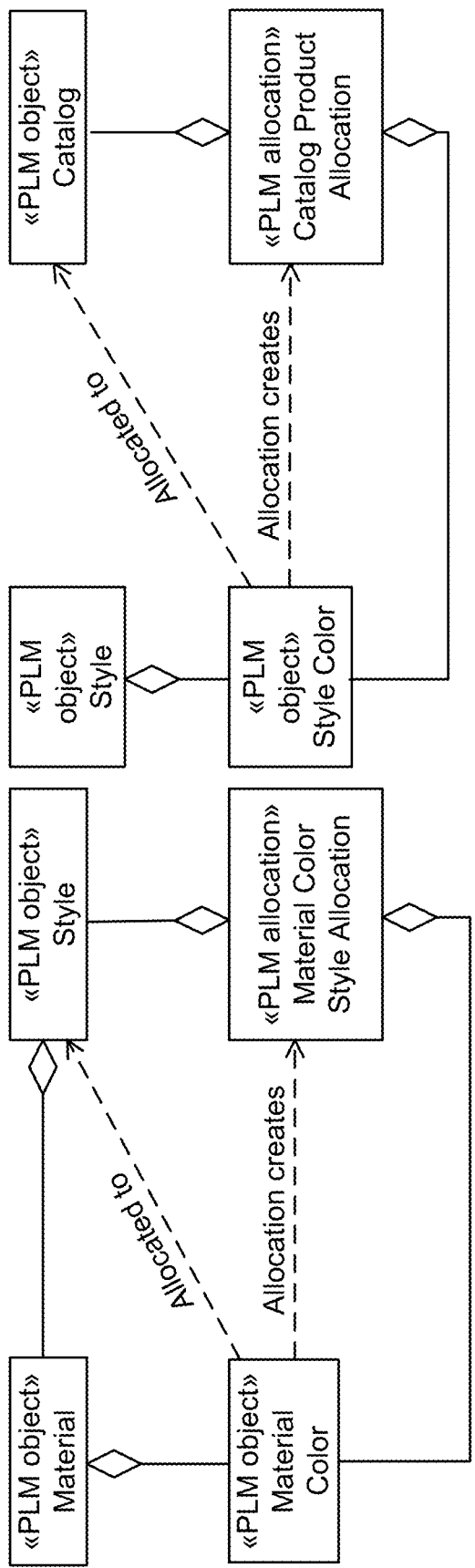
Figure 9
Figure 10
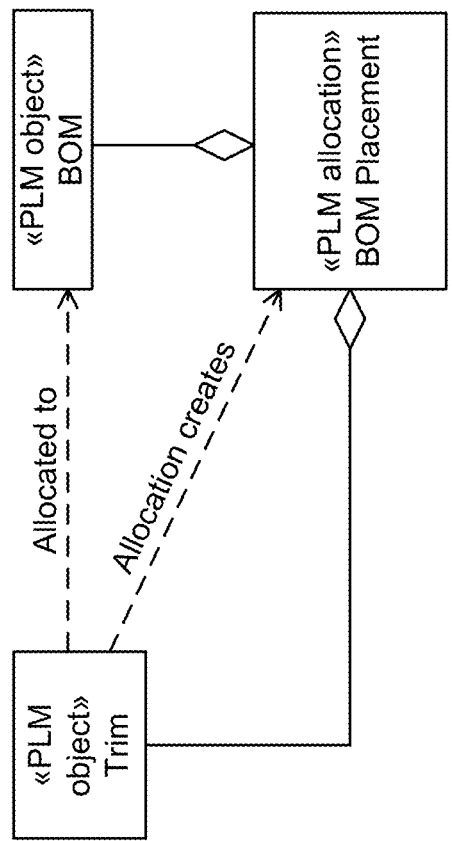
Figure 11

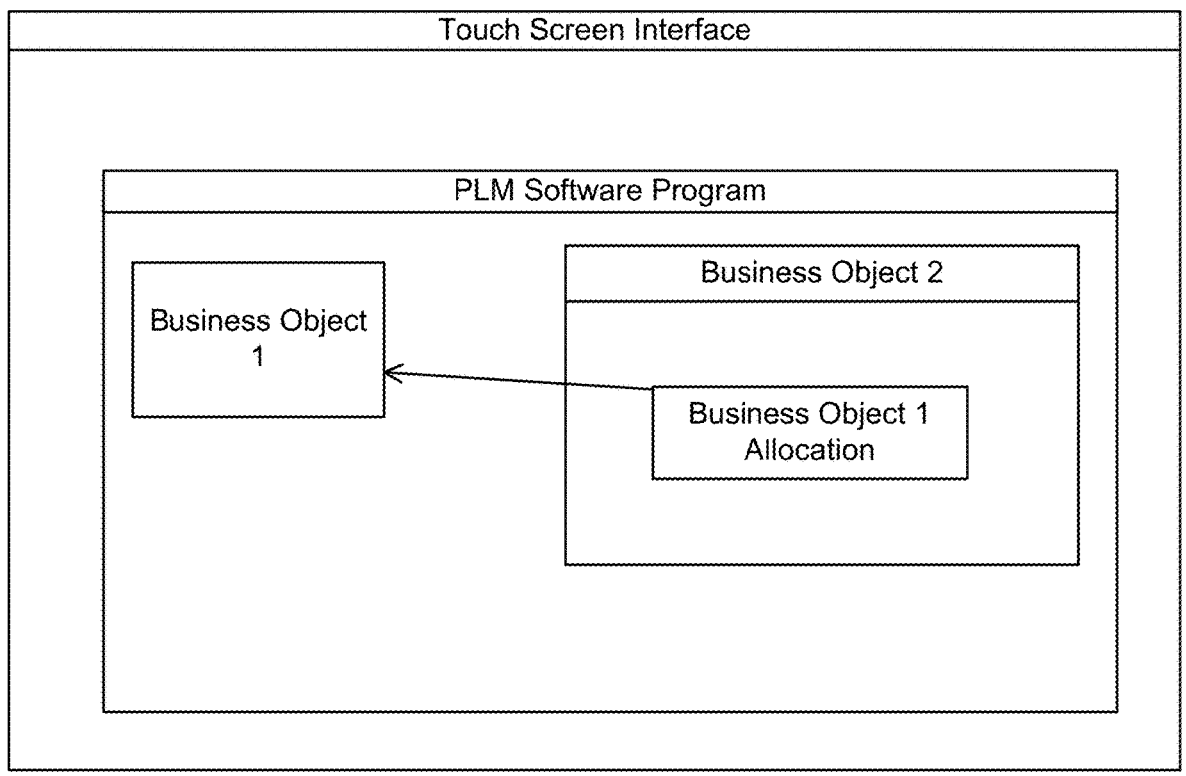
Figure 14
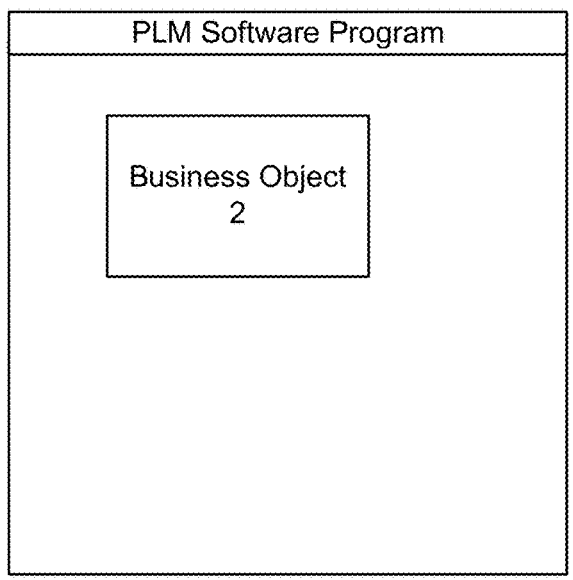 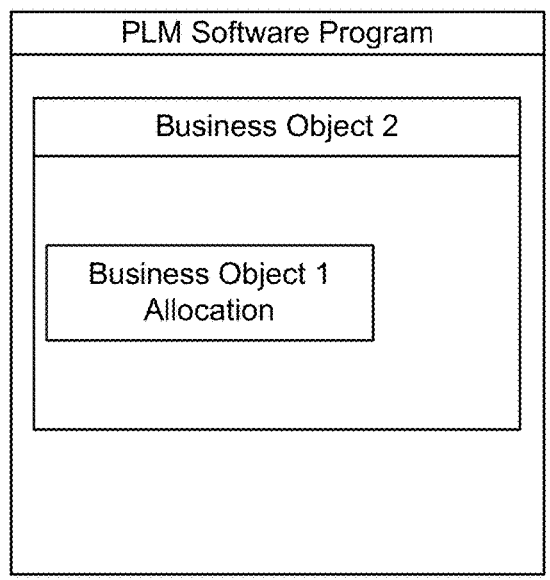
Figure 15A  Figure 15B

Updating an allocation

Notes:
The business object is
managed in the PLM
system provides.

Notes:
The user is using a touch
screen to view business
objects.

Select:
Business Object 1

Start

Process: Select a business object to allocated

Output:
Selection of
business object

Notes:
The user uses a press
and hold gesture to
open the view.

Process: Open a view to update the information about an allocation

Notes:
Values can include the
quantity to allocate, the
dates the allocation is
effective, and the price
or cost associated with
the allocation.

Process: Enter allocation properties

Notes:
The user enters the
property values of the
allocation.

Output:
Allocation properties 1932 (Continued in Figure 19B)

Figure 19A

Remove an allocation

Notes:
The business object is
managed in the PLM
system provides.

Select:
Business Object 1

Notes:
The user is using a touch
screen to view business
objects.

Start

Process: Select a
business object that
is allocated

Output:
Selection of business object

Notes:
The user uses a press
and hold gesture to
open the view.

Process: Open a view to
remove the allocation

Output:
A view is presented to remove the
allocation.

DRAG AND DROP ALLOCATION IN PLM

CROSS-REFERENCE TO RELATED APPLICATIONS

This patent application claims the benefit of U.S. patent applications 62/157,378, 62/157,384, and 62/157,392, filed May 5, 2015, which are incorporated by reference along with all other references cited in this application

BACKGROUND OF THE INVENTION

This invention relates to the field of software and more specifically to product lifecycle management software.

Product lifecycle management (or PLM) refers to the process of planning from the inception to the disposal of a product. This often includes an allocation step where all or a portion of a business object is assigned to a second business object. Business objects are things created in a PLM to represent business information. For example, during the allocation step, assignments are stored as relationships in PLM software. The relationships can have additional attributes like the status of the allocation or amount allocated.

Oftentimes, PLM software presents information differently than the way users make allocations in real life. PLM software uses a database and graphically displays business objects in tables as rows and business object attribute values as table columns for each row. To make an allocation from a business object to another business object, users use a text-based form to create the relationship and enter attribute values for the relationship.

This process is non-intuitive and does not correspond to how users allocate for a PLM in real life. For example, users with technical skills are required to operate the PLM system to complete filling in the form fields for each allocation. To get around this, users prefer to try out allocations using paper-based methods, such as using paper cards that represent business objects. This way, users can enter the finalized allocations into the PLM system at a later time, while allowing the users to easily make changes until then. However, these are labor intensive methods that are inefficient and result in errors.

Therefore, there is a need for improved product lifecycle management techniques, especially techniques for allowing users to intuitively make changes in PLM.

BRIEF SUMMARY OF THE INVENTION

In an implementation, a system includes software that mimics a paper based allocation process. Business objects can be presented graphically on a touch screen, and users can allocate business objects with other business objects using a drag and drop motion. For example, a symbol representing a business object can be dragged and dropped onto a symbol representing another business object. This will trigger a relationship to be created in the PLM database between the two business objects.

The system allows the benefits of ease of use and convenience from a paper based allocation, while allowing users with less technical skill to make allocations quickly. The system removes the step of recreating the allocations in the database at a later time because the database is updated with each drag and drop operation. This simplifies the allocation process because additional process steps are not required to synchronize the paper based allocation changes with the PLM system. Also, the user can be allowed to enter additional information regarding the allocation like the status or amount, which is difficult to maintain in a paper based process.

In an implementation, a method for a product lifecycle management (PLM) system for an organization includes: Providing a business object database, where the business object database comprises a plurality of business objects, each business object specifying business information of the organization. Providing a PLM database including a number of relationships between pairs of business objects stored in the business object database. Accessing in a product database a first product, where the first product is associated in the PLM database with a first business object stored in the business object database.

The method can include: Allowing a user to select a second business object stored in the business object database. Generating a first screen to display to the user, where the first screen includes graphically representing both first and second business objects. Presenting to the user the first screen on a touch screen. Detecting from the user a first input on the touch screen, where the first input includes selecting the second business object and associating the second business object to the first business object.

The method can include: Translating by the system the first input on the touch screen to one or more database operations to the PLM database. Executing the one or more database operations on the data stored in the PLM database. Storing in the product lifecycle management database a first relationship associating the first and second business objects based on the first input from the touch screen.

In another implementation, a method includes: operating a product lifecycle management system comprising allowing operations including: creating an allocation; validating the allocation; and removing an allocation.

Creating an allocation can include: selecting a business object to allocate; dragging a business object onto a drop target of another business object and dropping the business object; entering allocation properties for the allocation; validating the allocation; and creating the allocation.

Updating an allocation can include: selecting a business object to allocate; opening to view to update information about an allocation; entering allocation properties; validating the allocation; and updating the allocation.

Removing an allocation can include: selecting a business object that is allocated; opening a view to remove the allocation; validating the allocation removal; and removing the allocation.

Other objects, features, and advantages of the invention will become apparent upon consideration of the following detailed description and the accompanying drawings, in which like reference designations represent like features throughout the figures.

BRIEF DESCRIPTION OF THE DRAWINGS

FIG. 5 shows a color object allocated to a material object to create a material color allocation.

FIG. 6 shows a color object allocated to an organization context object to create a color pallet allocation.

FIG. 7 shows a silhouette object allocated to a material object to create a silhouette material allocation.

FIG. 8 shows a material object allocated to an organization context object to create a material list allocation.

FIG. 9 shows a material color and material object allocated to a style object to create a material color style allocation.

FIG. 10 shows a style color object allocated to a catalog object to create a catalog product allocation.

FIG. 11 shows a trim object allocated to a bill of materials (or BOM) object to create a BOM placement allocation.

FIG. 14 shows a screen demonstrating another drag-and-drop gesture feature of the system.

FIGS. 15A-15B show screens demonstrating a spread gesture feature of the system.

FIGS. 19A-19B show a flow for updating an allocation.

FIGS. 20A-20B show a flow for removing an allocation.

DETAILED DESCRIPTION OF THE INVENTION

Figure 1:
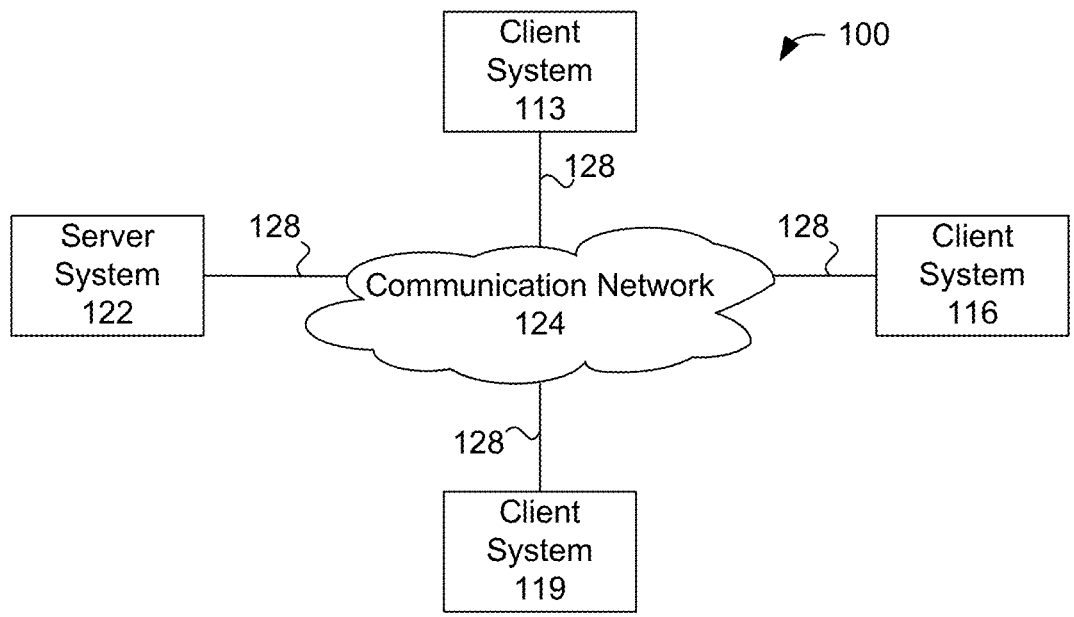
FIG. 1 shows a simplified block diagram of a client-server system and network in which an embodiment of the invention may be implemented.

FIG. 1 is a simplified block diagram of a distributed computer network 100 incorporating an embodiment of the present invention. Computer network 100 includes a number of client systems 113, 116, and 119, and a server system 122 coupled to a communication network 124 via a plurality of communication links 128. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Communication links 128 may be DSL, Cable, Ethernet or other hardwire links, passive or active optical links, 3G, 3.5G, 4G and other mobility, satellite or other wireless communications links, wave propagation links, or any other mechanisms for communication of information.

Various communication protocols may be used to facilitate communication between the various systems shown in FIG. 1. These communication protocols may include VLAN, MPLS, TCP/IP, Tunneling, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both as a client or a server depending on whether the computer system is requesting or providing information. Additionally, although aspects of the invention has been described using a client-server environment, it should be apparent that the invention may also be embodied in a stand-alone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Client systems 113, 116, and 119 enable users to access and query information stored by server system 122. In a specific embodiment, the client systems can run as a stand-alone application such as a desktop application or mobile smartphone or tablet application. In another embodiment, a "web browser" application executing on a client system enables users to select, access, retrieve, or query information stored by server system 122. Examples of web browsers include the Internet Explorer browser program provided by Microsoft Corporation, Firefox browser provided by Mozilla, Chrome browser provided by Google, Safari browser provided by Apple, and others.

In a client-server environment, some resources (e.g., files, music, video, or data) are stored at the client while others are stored or delivered from elsewhere in the network, such as a server, and accessible via the network (e.g., the Internet). Therefore, the user's data can be stored in the network or "cloud." For example, the user can work on documents on a client device that are stored remotely on the cloud (e.g., server). Data on the client device can be synchronized with the cloud.

Figure 2:
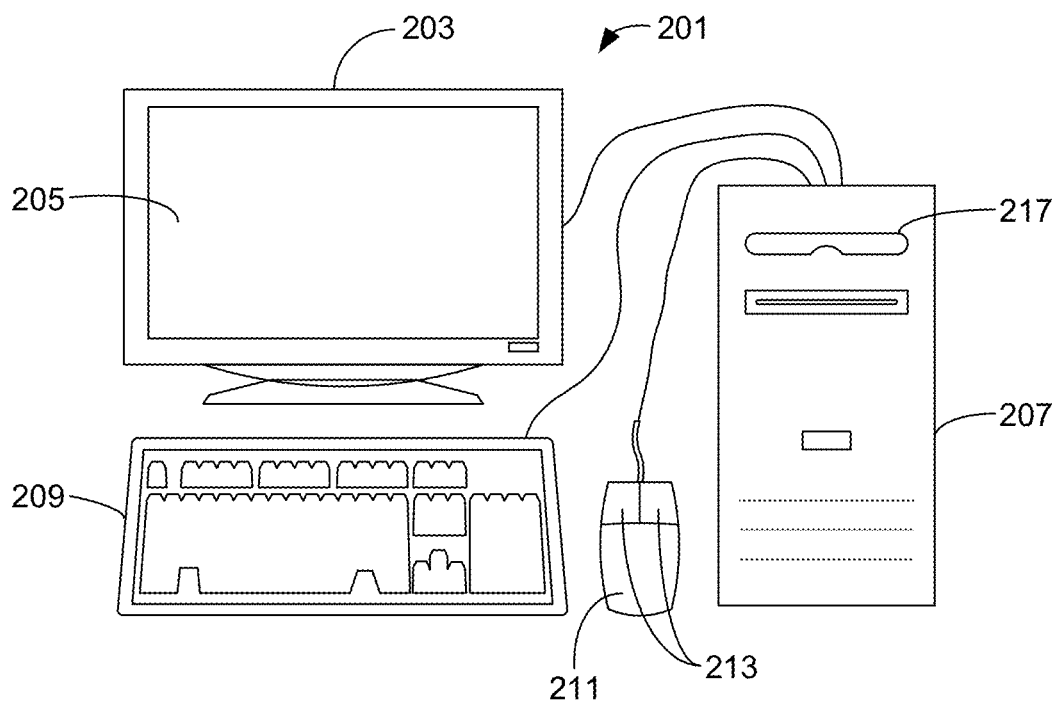
FIG. 2 shows a more detailed diagram of an exemplary client or computer which may be used in an implementation of the invention.

FIG. 2 shows an exemplary client or server system of the present invention. In an embodiment, a user interfaces with the system through a computer workstation system, such as shown in FIG. 2. FIG. 2 shows a computer system 201 that includes a monitor 203, screen 205, enclosure 207 (may also be referred to as a system unit, cabinet, or case), keyboard or other human input device 209, and mouse or other pointing device 211. Mouse 211 may have one or more buttons such as mouse buttons 213.

It should be understood that the present invention is not limited any computing device in a specific form factor (e.g., desktop computer form factor), but can include all types of computing devices in various form factors. A user can interface with any computing device, including smartphones, personal computers, laptops, electronic tablet devices, global positioning system (GPS) receivers, portable media players, personal digital assistants (PDAs), other network access devices, and other processing devices capable of receiving or transmitting data.

For example, in a specific implementation, the client device can be a smartphone or tablet device, such as the Apple iPhone (e.g., Apple iPhone 5), Apple iPad (e.g., Apple iPad or Apple iPad mini), Apple iPod (e.g., Apple iPod Touch), Samsung Galaxy product (e.g., Galaxy S series product or Galaxy Note series product), Google Nexus devices (e.g., Google Nexus 4, Google Nexus 7, or Google Nexus 10), and Microsoft devices (e.g., Microsoft Surface tablet). Typically, a smartphone includes a telephony portion (and associated radios) and a computer portion, which are accessible via a touch screen display.

There is nonvolatile memory to store data of the telephone portion (e.g., contacts and phone numbers) and the computer portion (e.g., application programs including a browser, pictures, games, videos, and music). The smartphone typically includes a camera (e.g., front facing camera or rear camera, or both) for taking pictures and video. For example, a smartphone or tablet can be used to take live video that can be streamed to one or more other devices.

Enclosure 207 houses familiar computer components, some of which are not shown, such as a processor, memory, mass storage devices 217, and the like. Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive or solid state drive (SSD)), battery-backed-up volatile memory, tape storage, reader, and other similar media, and combinations of these.

A computer-implemented or computer-executable version or computer program product of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software of the present invention may also be stored or reside on mass storage device 217 (e.g., hard disk, magnetic disk, tape, or CD-ROM). As a further example, code of the invention may be transmitted via wires, radio waves, or through a network such as the Internet.

Figure 3:
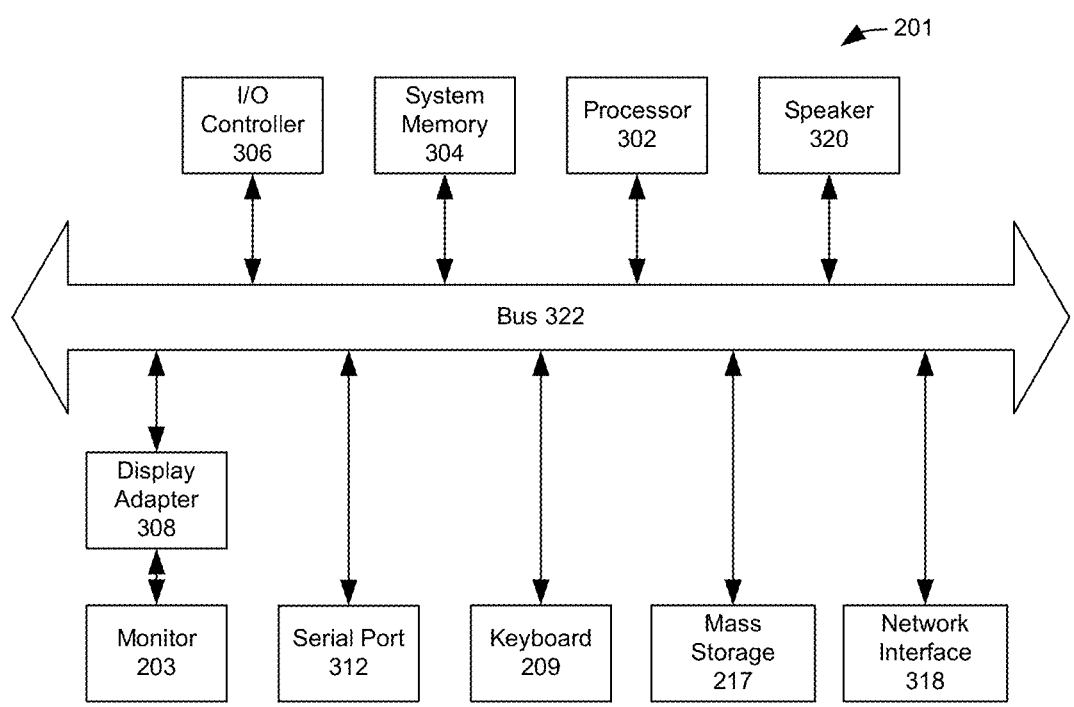
FIG. 3 shows a system block diagram of a client computer system used to execute an application program according to the invention.

FIG. 3 shows a system block diagram of computer system 201 used to execute the software of the present invention. As in FIG. 2, computer system 201 includes monitor 203, keyboard 209, and mass storage devices 217. Computer system 501 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks, www.mathworks.com), SAS, SPSS, JavaScript, AJAX, Java, Python, Erlang, and Ruby on Rails. The computer software product may be an independent application with data input and data display modules. Alternatively, the computer software products may be classes that may be instantiated as distributed objects. The computer software products may also be component software such as Java Beans (from Oracle Corporation) or Enterprise Java Beans (EJB from Oracle Corporation).

An operating system for the system may be one of the Microsoft Windows® family of systems (e.g., Windows 95, 98, Me, Windows NT, Windows 2000, Windows XP, Windows XP x64 Edition, Windows Vista, Windows 7, Windows 8, Windows CE, Windows Mobile, Windows RT), Symbian OS, Tizen, Linux, HP-UX, UNIX, Sun OS, Solaris, Mac OS X, Apple iOS, Android, Alpha OS, AIX, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless (e.g., 2G, 3G, 4G, 3GPP LTE, WiMAX, LTE, LTE Advanced, Flash-OFDM, HIPERMAN, iBurst, EDGE Evolution, UMTS, UMTS-TDD, 1xRDD, and EV-DO). For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

In other implementations, the user accesses the system through either or both of native and nonnative applications. Native applications are locally installed on the particular computing system and are specific to the operating system or one or more hardware devices of that computing system, or a combination of these. These applications (which are sometimes also referred to as "apps") can be updated (e.g., periodically) via a direct internet upgrade patching mechanism or through an applications store (e.g., Apple iTunes and App store, Google Play store, and Windows Phone App store).

The system can run in platform-independent, nonnative applications. For example, client can access the system through a web application from one or more servers using a network connection with the server or servers and load the web application in a web browser. For example, a web application can be downloaded from an application server over the Internet by a web browser. Nonnative applications can also be obtained from other sources, such as a disk.

Some specific flows for determining a technique of the invention are presented in this application, but it should be understood that the invention is not limited to the specific flows and steps presented. A flow of the invention may have additional steps (not necessarily described in this application), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on the data.

In an implementation, the system includes one or more of the following components:

(1) A touch screen interface allowing users to select, manipulate, add, and save changes made in a PLM.

(2) A PLM software program that graphically displays business objects.

(3) A means for a user to touch a business object represented on a screen and then drag the business object on the screen. For example, a user can use their finger or a stylus on a touch enabled screen.

(4) A means for a business object to have a drop target. For example for a first business object, the first business object includes a drop target that is included with the first business object.

(5) A means to validate if a business object can be dropped on a target. For example, if a business object includes certain limitations on usage the system will alert a user that the business object can or can not be used on a drop target.

(6) A means for a user to drop a business object on a drop target.

(7) A means to transfer information from the dropped business object to the target business object.

(8) A means to request additional information about the allocation from the user after the business object is dropped.

(9) A means to create a relationship in a database between two business objects.

(10) A means to trigger business processes that will operate on the relationship between two business objects.

(11) A means to delete a relationship in a database between two business objects when one business object is dragged and dropped off of another business object.

(12) A means to translate gestures and other touch input for the PLM software to receive gesture events from the touch screen in order to allow the user to interact with the business objects that are displayed. Some example gestures include:

Gesture: drag and drop—a user can drag a business object onto the drop target of another business object by touching the business object and moving their hand onto the drop target of another business object. A user can drop by lifting their finger off of the screen, which will create the allocation.

Gesture: press and hold—a user can open an allocation property window by pressing and holding their finger on an allocation.

Gesture: drag and drop—a user can drag a business object allocation off of another business object by touching the business object and moving their hand off the containing business object. A user can drop by lifting their finger off of the screen, which will remove the allocation.

Gesture: spread—a user can reveal allocations associated to a business object by touching a business object with two figures, and then spreading the fingers apart. This is useful when there is more than one allocation made and not all business objects are visible.

Examples of different allocation scenarios possible with the system follow:

(a) Assigning colors from a seasonal color pallet to a material.

(b) Assigning a material to a mill to create material samples.

(c) Assigning a product to a supplier to create product prototypes.

(d) Assigning a product to a sales region with a unit sales target.

An example use case for producing an article of clothing using a drag and drop feature of the system follows:

1. Present on a touch device a business object, such as a sketch or silhouette of the article of clothing. The sketch includes the shape of the article of clothing, but not specific details (e.g., color, fabric, capacity of suppliers, suppliers, or other information).

2. Allow a user to input using the touch screen different business objects onto the article of clothing. One or more business objects can be assigned to the article of clothing.

3. Allow the user to change and update business objects assigned to the article of clothing.

4. Update in PLM database to reflect assigned business objects.

Figure 4:
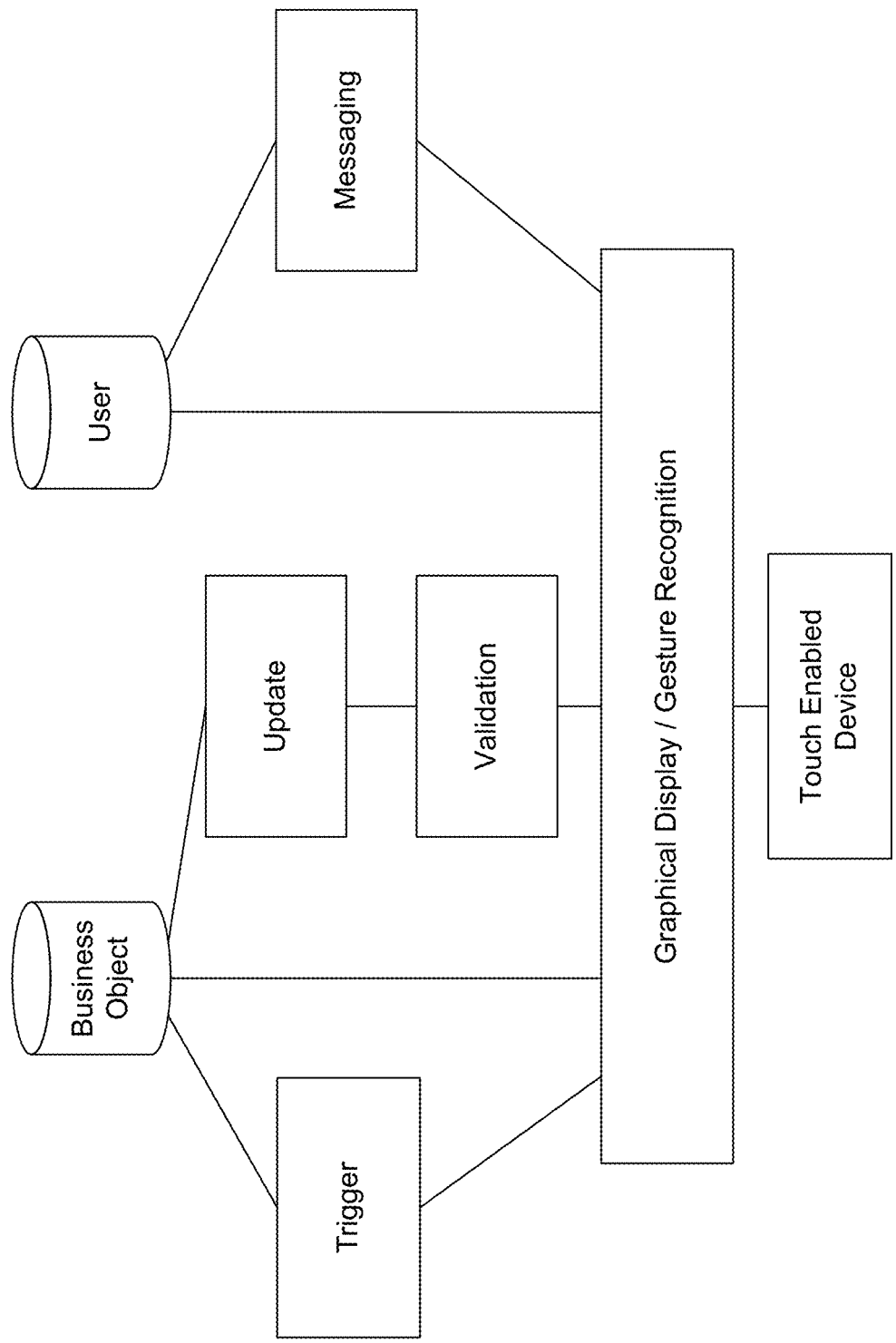
FIG. 4 shows a block diagram of a system including a drag and drop tool for a product lifecycle management system.

FIG. 4 shows a block diagram of a system including a drag and drop tool for a product lifecycle management system. The system includes a business object and user databases. The business object database stores business objects of the organization. The user database stores information on users of the system. Users access the system using touch enabled devices. Some examples of touch enabled devices include a touch screen monitor, smart phones, tablets, and other devices. The touch enabled device is coupled to a graphical display and gesture recognition module. This module generates graphical displays for the user and receives inputs from the user. A validation module allows the system to validate relationships made by users in the system. If a relationship made by a user is possible, an update module creates the necessary connections in the business object database. A trigger module allows users to execute business objects in the business objects database. The system includes a messaging module. This allows users to message each other regarding what they have done in the system. For example, one user may want to know why a business object was allocated a certain way.

FIGS. 5-11 shows different examples of allocations.

FIG. 5 shows a color object allocated to a material object to create a material color allocation. FIG. 6 shows a color object allocated to an organization context object to create a color pallet allocation. FIG. 7 shows a silhouette object allocated to a material object to create a silhouette material allocation. FIG. 8 shows a material object allocated to an organization context object to create a material list allocation. FIG. 9 shows a material color and material object allocated to a style object to create a material color style allocation. FIG. 10 shows a style color object allocated to a catalog object to create a catalog product allocation. FIG. 11 shows a trim object allocated to a bill of materials (or BOM) object to create a BOM placement allocation.

Figure 12:
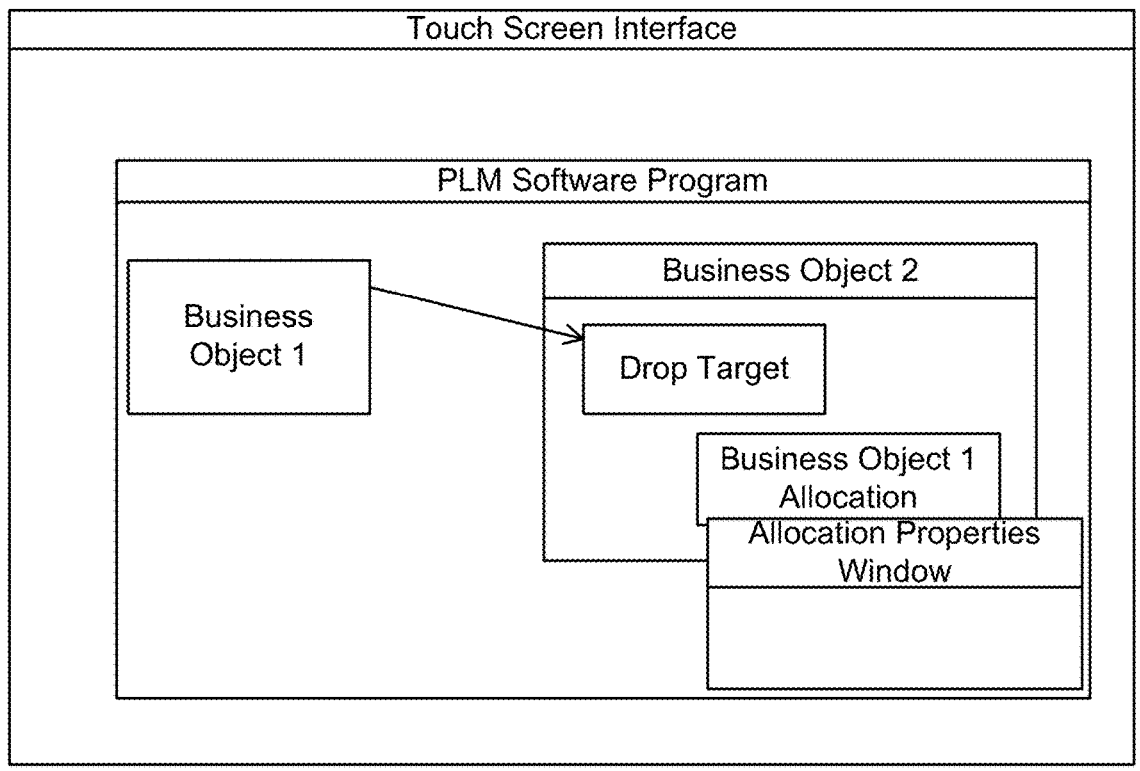
FIG. 12 shows a screen demonstrating a drag-and-drop gesture feature of the system.

FIG. 12 shows a screen demonstrating a drag-and-drop gesture feature of the system. In this figure, business object 1 is selected by touch, moved, and dropped onto a drop target of business object 2. The system then makes appropriate updates in a PLM database reflecting the gesture (e.g., business object 1 is related to business object 2). In an implementation, an allocation properties window appears after the gesture. This allows a user to enter in details on a created relationship (e.g., number, dates, or other information) between the business objects.

Figure 13:
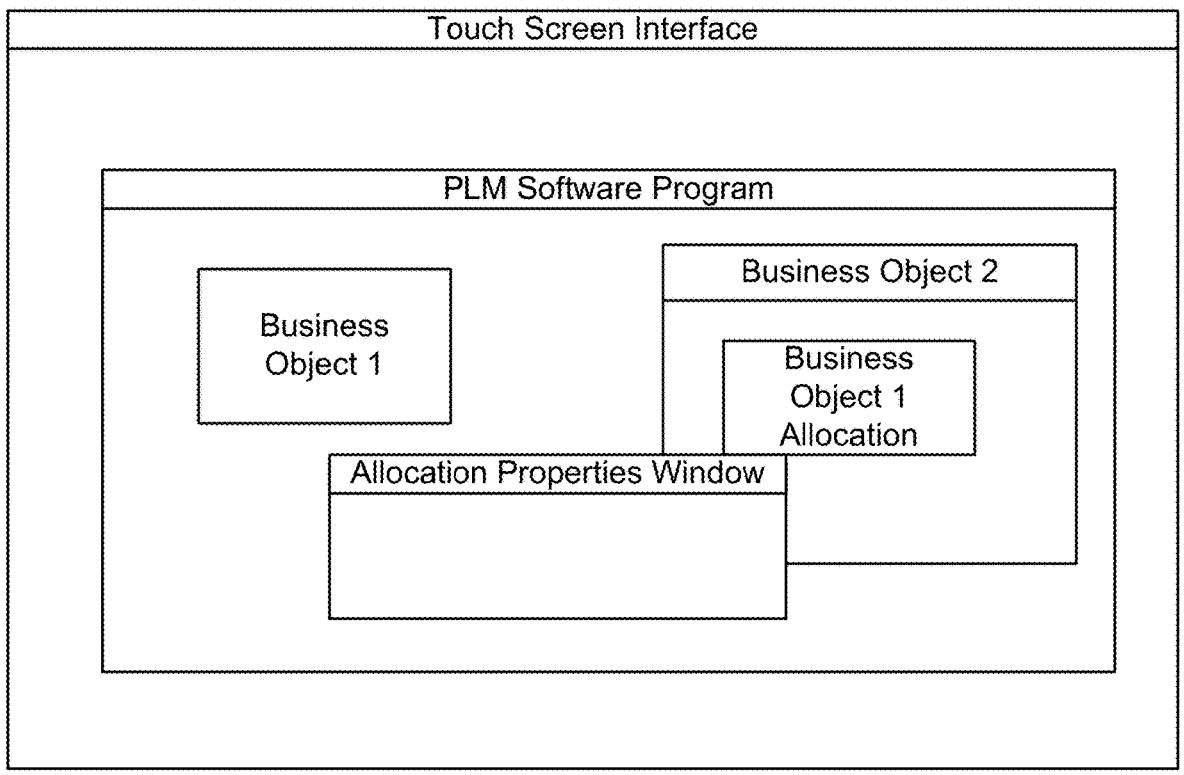
FIG. 13 shows a screen demonstrating a press-and-hold gesture feature of the system.

FIG. 13 shows a screen demonstrating a press-and-hold gesture feature of the system. In this figure, a user selects business object 2 by touch and holds the selection. After a system-determined period of time (e.g., 1, 2, 3, 4 or more seconds), an allocation properties window appears to allow the user to enter in details on a business object. The system then makes appropriate updates in a PLM database reflecting the gesture (e.g., changes are made to the business object 1 allocation).

FIG. 14 shows a screen demonstrating another drag-and-drop gesture feature of the system. In this figure, a business object 1 allocation is selected by touch, moved, and dropped onto a business object 1. The system then makes appropriate updates in a PLM database reflecting the gesture (e.g., business object 1 allocation is updated).

FIGS. 15A and 15B show screens demonstrating a spread gesture feature of the system. FIG. 15A shows a screen where a user can select a business object 2 by touch on a touch screen using two or more fingers. FIG. 15B shows a screen where the user has moved their fingers away from each other, while still in contact with the touch screen. The system queries a PLM database to determine what allocations have been made with business object 2. In this case, the system has stored in its PLM database a business object 1 allocation with business object 2, so that business object 1 appears.

Figure 16:
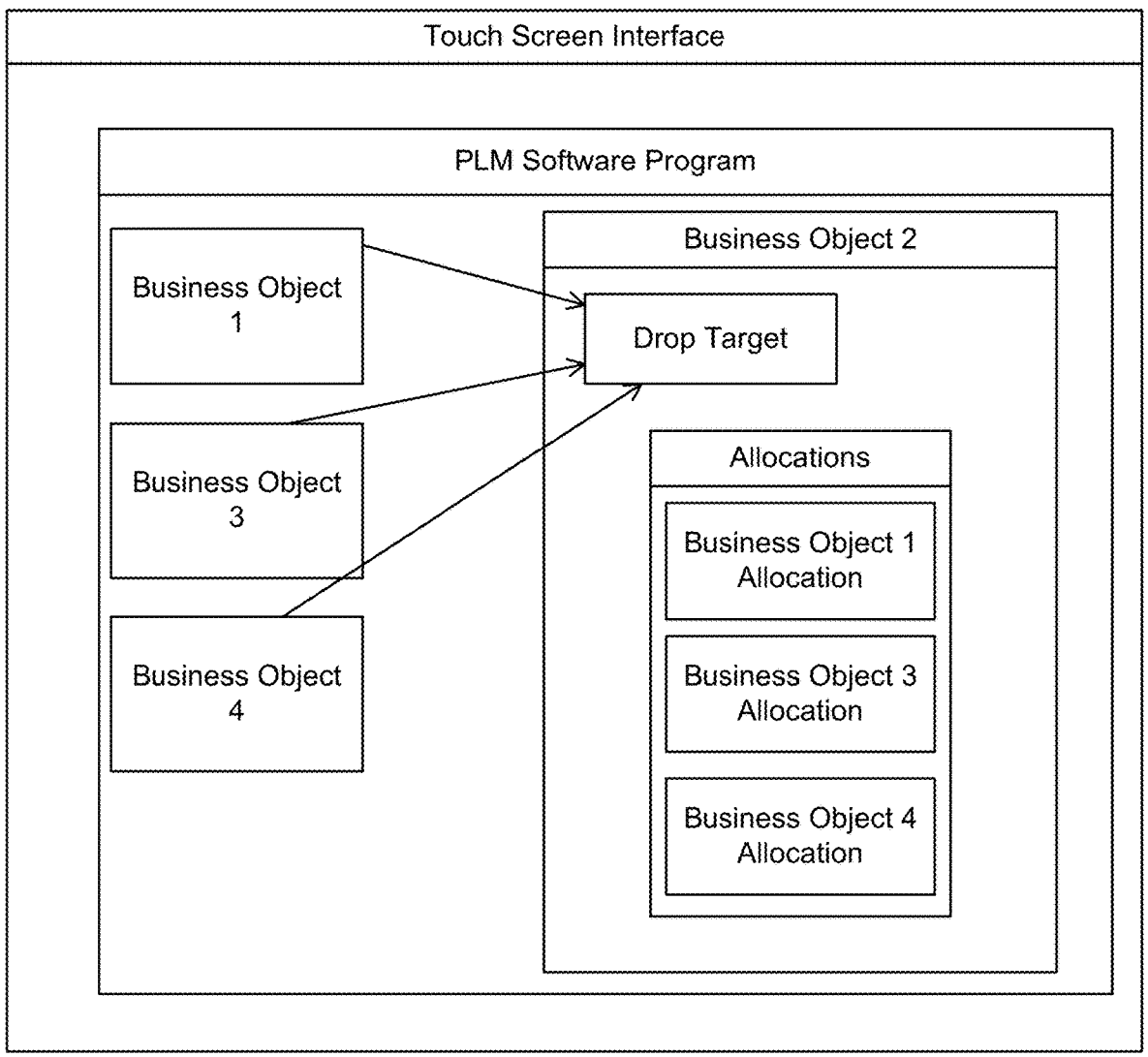
FIG. 16 shows a screen demonstrating more than one allocation made with a drag-and-drop gesture feature of the system.

FIG. 16 shows a screen demonstrating more than one allocation made with a drag-and-drop gesture feature of the system. In this figure, business objects 1, 2, 3, and 4 are shown. A user selects business objects 1, 3, and 4 by touch, moves the selection to a drop target of business object 2. The user can select business object 1, 3, and 4 individually, repeating the gesture more than once, or selects business object 1, 3, and 4 first, before moving the selected objects to the drop target. The system then makes appropriate updates in a PLM database reflecting the gesture (e.g., changes are made to the business object 1 allocation). In this figure, a business object 1 allocation is selected by touch, moved, and dropped onto a business object 1. The system then makes appropriate updates in a PLM database reflecting the gesture (e.g., business objects 1, 3, and 4 are related to business object 2).

Figure 17:
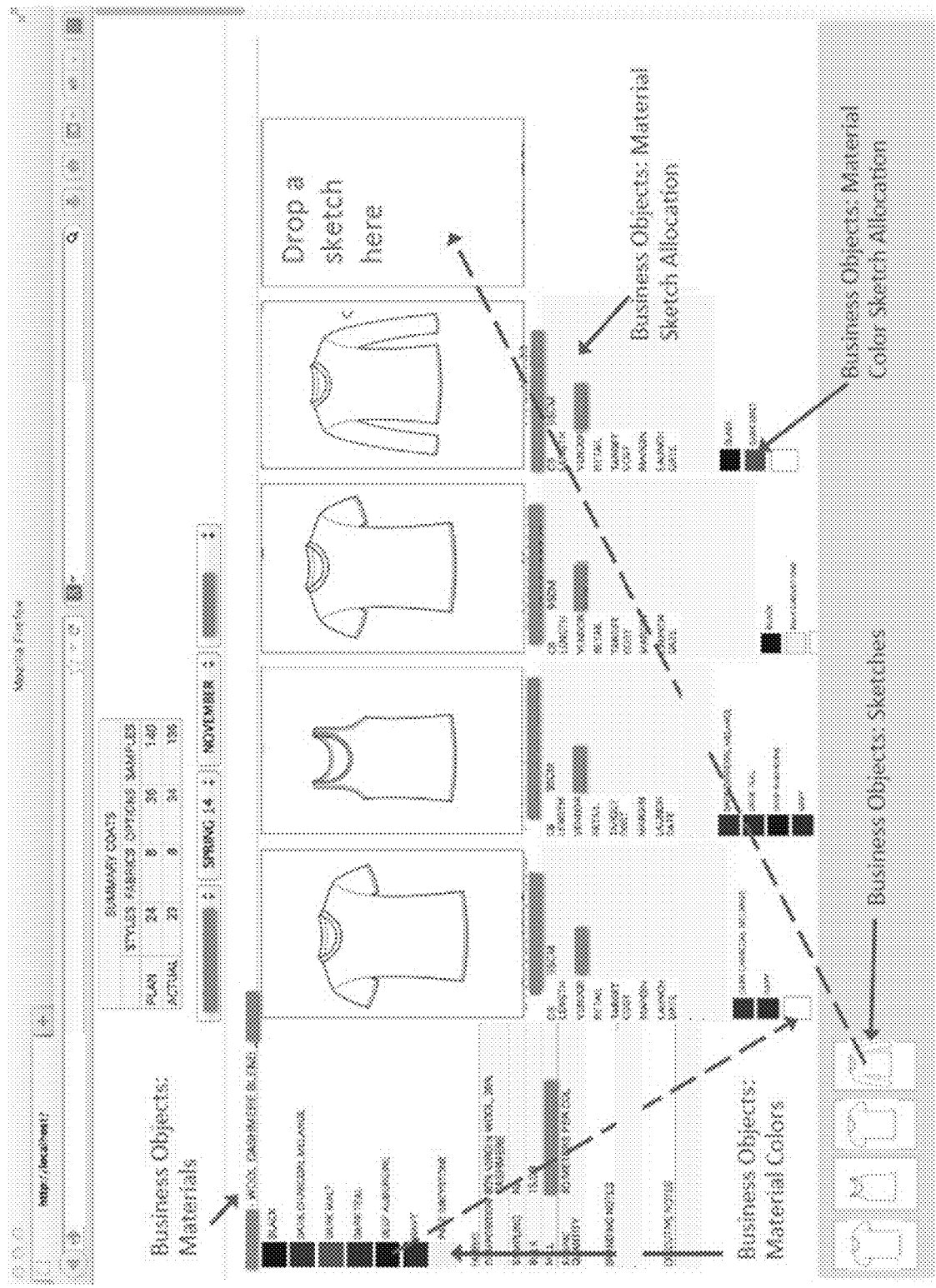
FIG. 17 shows a screen including numerous types of business objects.

FIG. 17 shows a screen including numerous types of business objects. In this figure, materials, sketches, material colors, material color sketch are included. For example, four business object allocations are shown as sketches in the center of the screen. A sketch type business object includes a sketch or silhouette of objects tracked in a PLM, as shown in the bottom of the screen. Here, the PLM includes four different clothing objects (e.g., t-shirt, vest, long-sleeved shirt). Additional business objects of sketch type can be added or removed from the view as needed by a user (e.g., drag-and-drop a business object). On the left side of the screen, different business object types and some of options for the business object types are shown. For example, for business object type materials, wool or cashmere blend can be selected. As another example, for business object type material colors, black, dark charcoal mélange, dark malt, and other color options can be selected. Options for business object types materials and colors can be selected and associated with the sketches shown in the center of the screen (e.g., through a drag-and-drop gesture). This creates an allocation in the system, as well as corresponding changes in a PLM database. The user can view the allocations for each business object as they continue to make additional allocations.

In an implementation, when allocations are made using the system between business objects, they appear on a screen before and after allocations are made. For example, when a material color business object of black is made to a sketch business object, a graphical representation for the material color business object of black remains on the screen. This is because some business objects can be used in more than one allocation (e.g., another sketch business object can also include material color business object of black).

In an implementation, a technique for graphically allocates items with a touch screen. Various aspects or concepts can include the following numbered items. Some of the numbered items provide additional details, variations, or specificity to an aspect or concept that is identified by number within brackets.

Figure 18A:
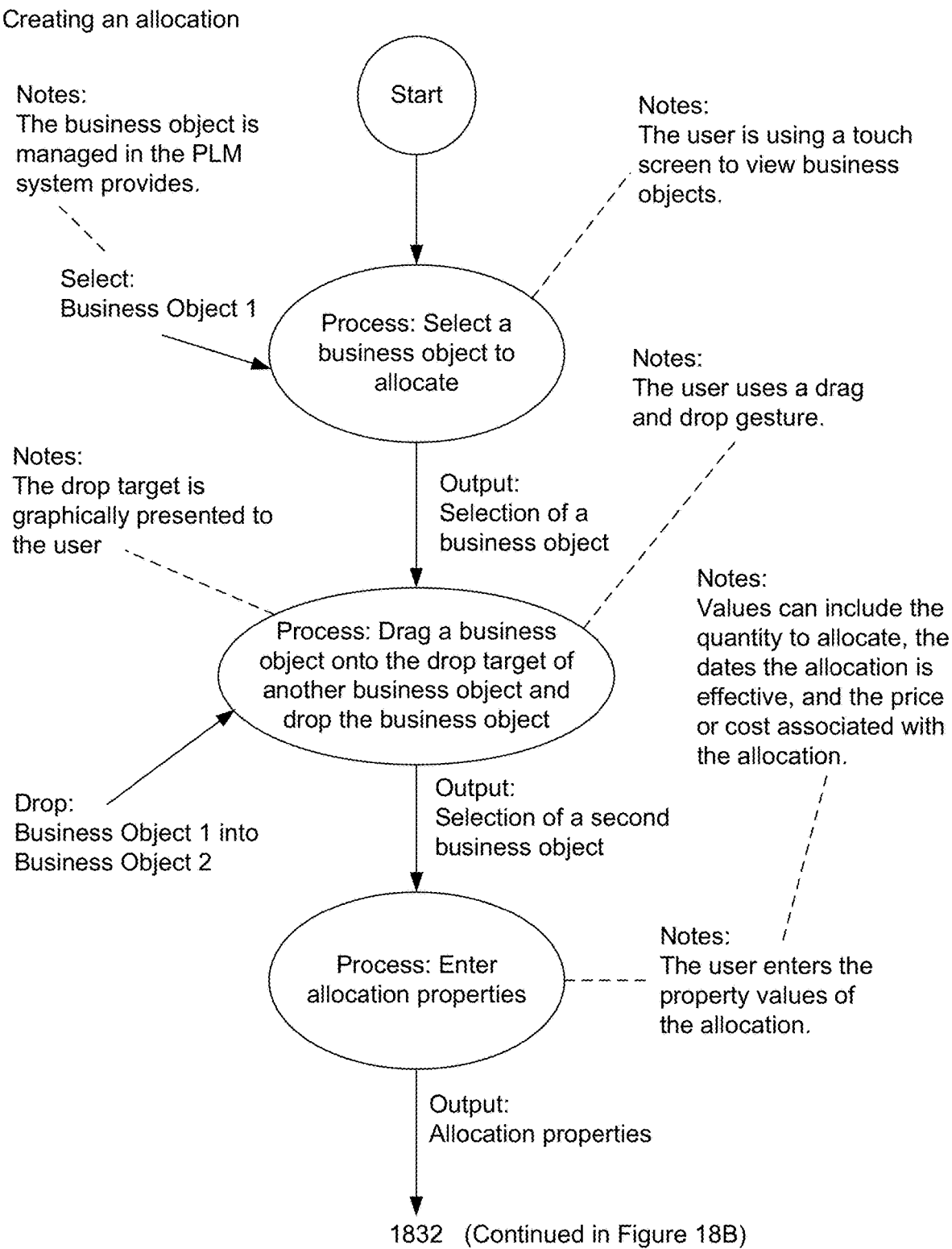
FIGS. 18A-18B show a flow for creating an allocation.
Figure 18B:
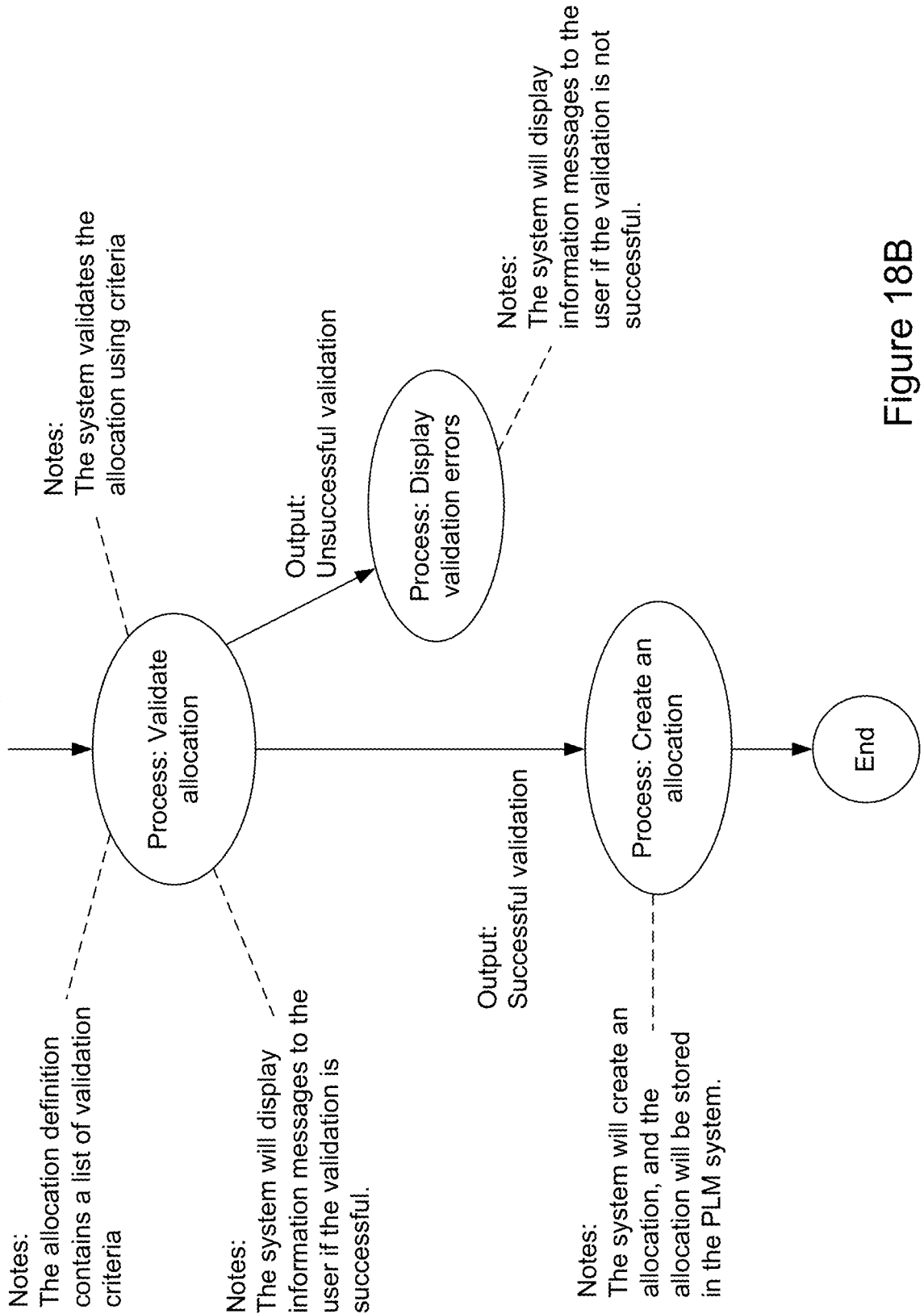
Figure 19B:
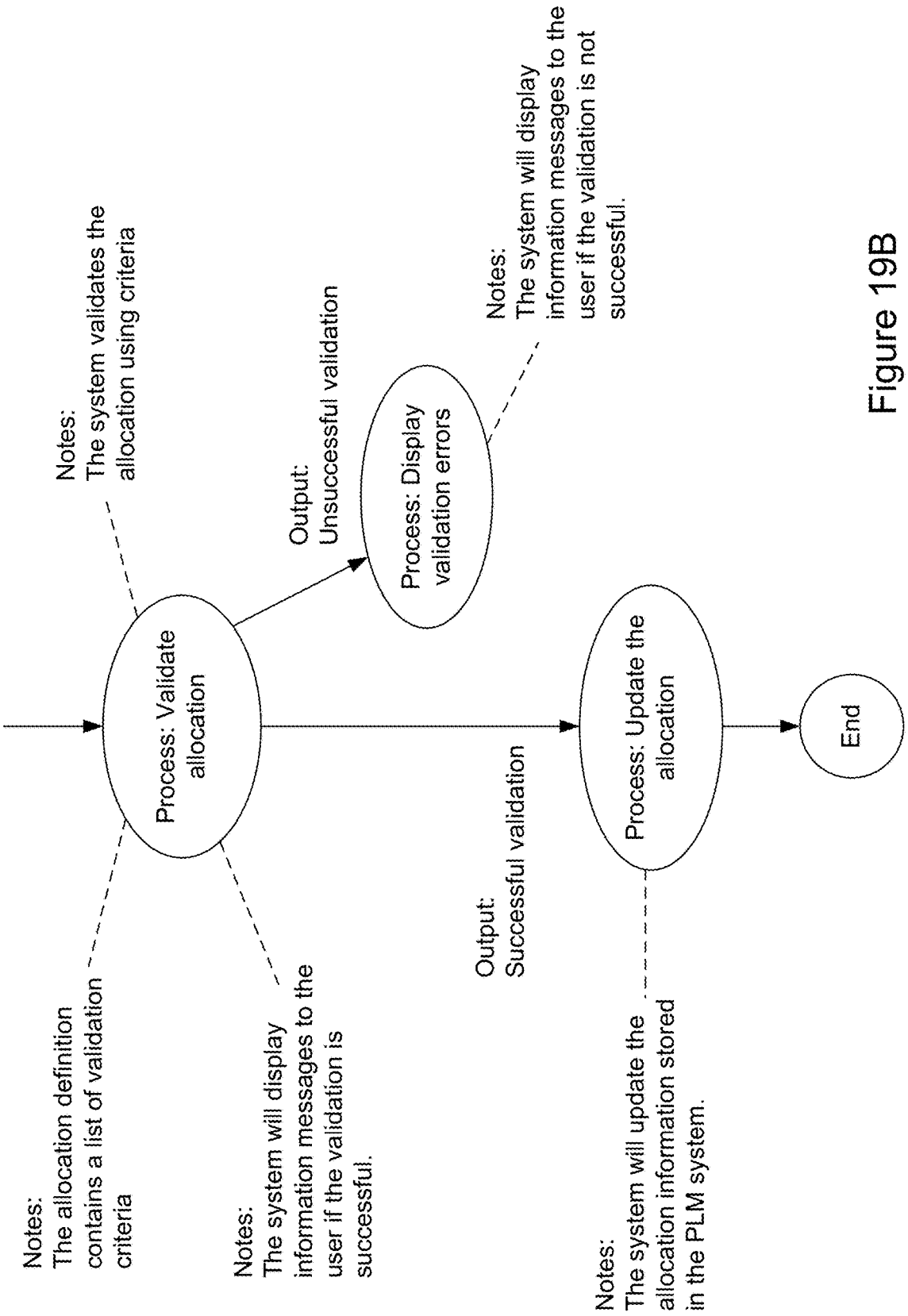
Figure 20B:
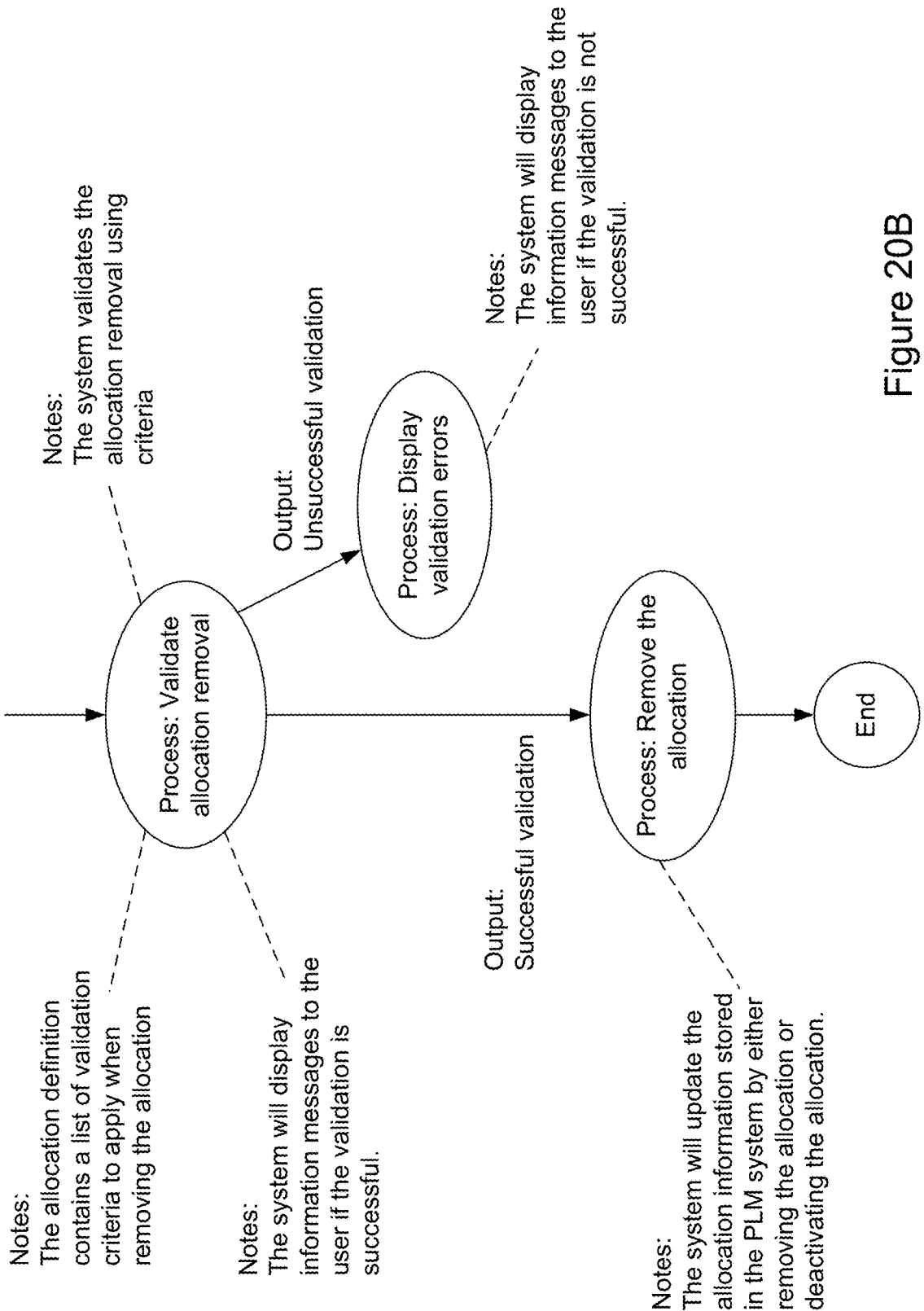

FIGS. 18A-18B show a flow for creating an allocation.
FIGS. 19A-19B show a flow for updating an allocation.
FIGS. 20A-20B show a flow for removing an allocation.
1. Allocating a business object to another business object.
2. [1] Providing a touch screen to display business objects.
3. [1] Proving gestures to allow the user to allocate business objects.
4. [1] Providing a drop target to drop a business object to initiate the allocation of a business object to another business object.
5. [1] A means for a user to provide information about the allocation.
6. [1] Validating that the allocation is allowed using criteria.
7. [1] A means to store the allocation in a PLM system.
8. [1] A means to change an allocation.
9. [1] A means to undo an allocation.
10. [2] A means to retrieve information for business objects from a PLM system.
11. [2] A means to graphically display information about a business object on a touch screen.
12. [2] A means to graphically display that a business object can be dragged.
13. [3] Gestures can include dragging a business object on top of the drop target of another business object.
15. [3] Gestures can include dropping a business object on the drop target of another business object.
16. [3] Gestures can include pressing and holding on a business object to open subviews for the business object.
17. [3] Gestures can include spreading fingers on a business object to zoom the view containing the business object to reveal addition information.

18. [4] A means to graphically display the drop target for a business object.

19. [4] A means to graphically display the status of the drop target.

20. [5] A means for a user to type in additional information about the allocation.

21. [5] A means for a user to graphically select additional information about the allocation.

22. [5] A means for a user to reference other business objects as additional information about the allocation.

23. [20] Additional allocation information can include the quantity of the business object to allocate to the second business object.

24. [20] Additional allocation information can include dates that allocation is valid for.

25. [20] Additional allocation information can include price or costs related to the allocation.

26. [6] A means to use criteria to validate that a business object can be allocated to another business object.

27. [6] A means to display error messages when a validation fails.

28. [6] A means to display a success message when a validation is successful.

29. [20] Validation criteria can include the properties of the business objects.

30. [20] Validation criteria can include the role of the user.

31. [20] Validation criteria can include the additional information provided by a user.

32. [7] A means to automatically process the creation of the allocation.

33. [7] A means to store the allocation in a PLM system.

34. [8] A means to change the information about the allocation.

35. [31] A means to revalidate the allocation when the allocation information is changed.

36. [9] A means for the user to undo an allocation.

37. [36] A means for the allocation to be removed from the PLM system.

38. [36] A means for the allocation to be made inactive in the PLM system.

39. A means to display the history of changes to an allocation.

40. [39] The history of changes can include the values before and after a change.

41. [39] The history of changes can include the date a change was made.

42. [39] The history of changes can include the user that made a change

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method for a product lifecycle management (PLM) system for an organization comprising:
providing a business object database, wherein the business object database comprises a plurality of business objects, each business object specifying business and product information of the organization;
providing a PLM database, comprising a plurality of relationships between pairs of business objects stored in the business object database;
accessing in a product database a first product, wherein the first product is associated in the PLM database with a first business object stored in the business object database;
allowing a user to select a second business object stored in the business object database;
generating a first screen to display to the user, wherein the first screen includes graphically representing the first business object and the second business object;
presenting to the user the first screen on a touch screen;
detecting from the user a first input on the touch screen, wherein the first input comprises selecting the second business object and then selecting the first business object to associate the second business object to the first business object;
in response to detecting the first input, selecting an allocation definition corresponding to a relationship to be formed in the PLM database based on the first business object and the second business object;
translating by the system, based on the allocation definition, the first input on the touch screen to one or more database operations to the PLM database;
executing the one or more database operations on the data stored in the PLM database; and
storing in the PLM database a first relationship associating the first and second business objects based on the first input from the touch screen.

2. The method of claim 1 wherein the first input comprises the steps of:
selecting by the user the graphical representation of the second business object;
holding by the user the graphical representation of the second business object while dragging across the touch screen the second business object until reaching a drop target associated with the first business object; and
releasing by the user the graphical representation of the second business object while the graphical representation hovers over the drop target associated with the first business object.

3. The method of claim 1 wherein the one or more database operations comprises a create relationship between the first and second business objects in the PLM database that previously did not exist.

4. The method of claim 1 wherein the first product comprises an article of clothing.

5. The method of claim 1 further comprising: allowing the user to select a third business object stored in the business object database;
generating a second screen to display to the user, wherein the second screen includes graphically representing both first and third business objects;
presenting to the user the second screen on the touch screen;
detecting from the user a second input on the touch screen, wherein the second input comprises selecting the third business object and associating the third business object to the first business object;
translating by the system the second input on the touch screen to another one or more database operations to the PLM database;
executing the other one or more database operations on the data stored in the PLM database; and storing in the PLM database a second relationship associating the first and third business objects based on the second input from the touch screen.

6. The method of claim 1 wherein the first product, in response to the one or more database operations, is modified in the PLM database manufacturing information for the first product stored in the product database.

7. The method of claim 1 wherein the translating comprises generating one or more database operations to assign the first business object, representing a material, to be associated with the second business object, representing a color, wherein the one or more database operations updates manufacturing information for the first product.

8. The method of claim 1 wherein the translating comprises generating one or more database operations to assign the first business object, representing a material, to be associated with the second business object, representing a fabric mill, wherein the one or more database operations updates manufacturing information for the first product.

9. The method of claim 1 wherein the translating comprises generating one or more database operations to assign the first business object, representing a prototype, to be associated with the second business object, representing a product supplier, wherein the one or more database operations updates manufacturing information for the first product.

10. The method of claim 1 wherein the translating comprises generating one or more database operations to assign the first business object, representing a geographical region, to be associated with the second business object, representing a unit sales target, wherein the one or more database operations updates manufacturing information for the first product.

11. The method of claim 1 wherein the first screen comprises including the first graphical representation of the first business object; and
presenting on the first screen the first product, without including on the first screen the one or more business objects associated with the first product.

12. The method of claim 1 wherein the executing the one or more database operations are executed before a second input on the touch screen corresponding to another one or more database operations.

13. The method of claim 1 comprising:
generating a second screen, after generating the first screen, to display to the user, wherein the second screen includes graphically representing both first and second business objects;
presenting to the user the second screen on the touch screen;
detecting from the user a second input on the touch screen, wherein the second input comprises selecting the second business object and disassociating the second business object with the first business object;
translating by the system the second input on the touch screen to another one or more database operations to the PLM database;
executing the other one or more database operations on the data stored in the PLM database; and
storing in the PLM database a modified first relationship disassociating the first and second business objects based on the second input from the touch screen.

14. The method of claim 13 wherein the one or more database operations are executed on the PLM database before the other one or more database operations.

15. The method of claim 1 comprising:
detecting from the user a second input on the touch screen, wherein the second input comprises selecting the first business object and spreading fingers of the user; and
in response to the second input, presenting to the user a graphical representation of the second business object.

16. The method of claim 1 comprising:
before translating, retrieving validation criteria defining whether a relationship with the first business object is possible in the PLM system; and
validating, based on the validation criteria, whether the second business object may be associated with the first business object.

17. The method of claim 1 comprising after the first input, receiving from the user an allocation property to associate with the association between the first and second business objects to define further details to associate with the association.

18. The method of claim 17 wherein the allocation property comprises a quantity to allocate.

19. The method of claim 17 wherein the allocation property comprises an allocation date.

20. The method of claim 17 wherein the allocation property comprises a pricing detail.

21. The method of claim 1 wherein the one or more database operations create a new relationship in the PLM database between the first and second business objects.

22. The method of claim 1 comprising:
validating that the first and second business objects may be associated,
wherein executing the one or more database operations is based at least in part on a successful validation that the first and second business objects may be associated.

23. The method of claim 22 wherein the successful validation is based in part on the user's role.

24. The method of claim 1 comprising:
receiving a spread gesture while selecting the first business object from the user;
determining a third business object associated with the first business object in the PLM database that is not shown on the first screen; and
generating a second screen to display to the user, wherein the second screen includes graphically representing both first, second, and third business objects.

25. The method of claim 1 wherein the detecting from the user the first input on the touch screen comprises:
detecting selection of a first graphical representation,
detecting selection of a second graphical representation,
in response to selection of the first graphical representation and the second graphical representation,
determining whether business objects corresponding to the first graphical representation and the second graphical representation may be associated, and
generating an error when the business objects corresponding to the first graphical representation and the second graphical representation are prevented from association.

26. The method of claim 1 comprising:
in response to a user touch gesture input, executing a query to the PLM database to determine allocations stored in the PLM database associated with the first business object or the second business object;
uncovering a first allocation of the first business object or the second business object, wherein the first allocation was not included with the first screen including the first business object and the second business object; and
updating the first screen with the first allocation.

27. The method of claim 26 wherein the user touch gesture input comprises a spread gesture while selecting the first business object or the second business object to execute the query to determine allocations associated with the first business object or the second business object.

28. A method for a product lifecycle management (PLM) system for an organization comprising:
    providing a business object database, wherein the business object database comprises a plurality of business objects, each business object specifying business and product information of the organization;
    providing a PLM database, comprising a plurality of relationships between pairs of business objects stored in the business object database;
    accessing in a product database a first product, wherein the first product is associated in the PLM database with a first business object stored in the business object database;
    allowing a user to select a second business object stored in the business object database;
    generating a first screen to display to the user, wherein the first screen includes graphically representing the first business object and the second business object;
    causing to be presented to the user the first screen on a touch screen;
    detecting from the user a first input on the touch screen, wherein the first input comprises selecting the second business object and then selecting the first business object to associate the second business object to the first business object;
    in response to detecting the first input, selecting an allocation definition corresponding to a relationship to be formed in the PLM database based on the first business object and the second business object;
    determining, based on the allocation definition, first criteria to be associated with the relationship to be formed in the PLM database;
    generating a second screen to display to the user, wherein the second screen includes an interface allowing the user to provide a first set of values for the first criteria;
    causing to be presented to the user the second screen on the touch screen;
    receiving the first set of values for the first criteria;
    validating, based on the allocation definition, that the first set of values for the first criteria are valid;
    when the first set of values are valid, translating by the system one or more database operations executed against the PLM database to form the relationship;
    executing the one or more database operations on the data stored in the PLM database; and
    storing in the PLM database a first relationship associating the first business object and the second business object based on the first input from the touch screen.

* * * * *